United States Patent
Rangarajan et al.

(10) Patent No.: US 7,127,603 B2
(45) Date of Patent: Oct. 24, 2006

(54) SYSTEM AND METHOD FOR MANUFACTURE OF INFORMATION HANDLING SYSTEMS WITH SELECTIVE OPTION ROM EXECUTIONS

(75) Inventors: Madhusudhan Rangarajan, Round Rock, TX (US); Paul D. Stultz, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 432 days.

(21) Appl. No.: 10/713,930

(22) Filed: Nov. 14, 2003

(65) Prior Publication Data

US 2005/0108515 A1 May 19, 2005

(51) Int. Cl.
*G06F 9/24* (2006.01)
*G06F 9/445* (2006.01)
(52) U.S. Cl. .............................................. 713/2; 713/1
(58) Field of Classification Search .................... 713/1, 713/2, 100
See application file for complete search history.

(56) References Cited

U.S. PATENT DOCUMENTS

| | | | |
|---|---|---|---|
| 5,696,968 A * | 12/1997 | Merkin | 713/2 |
| 5,974,546 A * | 10/1999 | Anderson | 713/2 |
| 6,061,745 A * | 5/2000 | Mahmoud | 710/1 |
| 6,282,647 B1 | 8/2001 | Leung et al. | 713/100 |
| 6,356,965 B1 | 3/2002 | Broyles et al. | 710/104 |
| 6,513,114 B1 * | 1/2003 | Wu et al. | 713/2 |
| 6,598,159 B1 | 7/2003 | McAlister et al. | 713/2 |
| 6,795,914 B1 * | 9/2004 | Smith et al. | 713/2 |
| 2002/0108033 A1 * | 8/2002 | Kroening | 713/1 |

* cited by examiner

*Primary Examiner*—Thomas Lee
*Assistant Examiner*—Ji H. Bae
(74) *Attorney, Agent, or Firm*—Hamilton & Terrille, LLP; Robert W. Holland

(57) ABSTRACT

Option ROMs associated with information handling system processing components is selectively disabled to reduce the time associated with one or more boots of the information handling system, such as during deployment of applications after manufacture of the information handling system. An Option ROM selector module identifies one or more Option ROMs to disable at a boot, such as Option ROMs associated with processing components that are not needed for deployment of applications, and communicates the disabled Option ROMs to an Option ROM boot execution controller of the information handling system, such as with SMBIOS tokens. At a subsequent boot, the Option ROM execution controller prevents the BIOS from loading disabled Option ROMs for execution so that boot time is reduced with impact to the deployment of applications.

20 Claims, 3 Drawing Sheets

SYSTEM AND METHOD FOR MANUFACTURE OF INFORMATION HANDLING SYSTEMS WITH SELECTIVE OPTION ROM EXECUTIONS

BACKGROUND OF THE INVENTION

1. Field of the Invention

The present invention relates in general to the field of information handling system manufacture, and more particularly to a system and method for manufacture of information handling systems with selective Option ROM executions.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are built from a variety of components and, once assembled, loaded with different types of applications. Typically, the components communicate with each other through an operating system that uses drivers adapted for particular components. On power-up of the information handling system, the system firmware, such as the basic input/output system (BIOS), initiates boot with a bootable device, typically the hard disc drive, to run the operating system and selected applications. Bootable devices are identified by the BIOS by reading a bootable device class code from the device mass media controllers and include SCSI, IDE, RAID, NIC, Fibre Channel and Infiniband devices. As the BIOS scans components at boot initiation, it loads Optional ROM code, known as Option ROM, into memory from the bootable devices for execution during boot. Generally, information handling systems boot to a hard disc drive which stores the operating system, however, other drives may supercede the hard disc drive, such as if a bootable CD-ROM disc is found by the BIOS during its scan.

During initial manufacture, information handling systems typically have software deployed to components through a network connection after initial boot through a PXE client or portable media, such as a floppy or USB key. In a PXE boot, the network interface card boots to a network location to download applications, such as an operating system image. After the PXE boot, the information handling system typically performs a number of reboots in a build process that performs tests, flashes firmware such as the BIOS, and otherwise configures the applications to run with the components of the information handling system. One difficulty with a factory build process that involves a number of reboots is that each reboot is time consuming. The amount of time for a boot generally depends on the number and type of components loaded on the information handling system and is sometimes reduced by altering the boot process, such as disabling memory testing. The execution of Option ROM during each boot tends to increase boot time, especially where an information handling system has a number of bootable devices. For instance, onboard and plug-in PCI cards add substantial time to each boot for the execution of Option ROM present in the card and in the BIOS for support detected cards. When PCI cards support RAID with multiple devices the time for each boot can be up to three to four minutes. Even a basic SCSI card can add thirty seconds to a minute to boot time if drives are connected. Over the course of building a number of information handling systems, these long boot times have a substantial impact on factory output even though the components associated with executed Option ROM are often not used in a particular boot sequence.

SUMMARY OF THE INVENTION

Therefore a need has arisen for a system and method which selectively disables Option ROM execution to provide more rapid boots.

In accordance with the present invention, a method and system are provided which substantially reduce the disadvantages and problems associated with previous methods and systems for executing multiple boots in a software deployment process. An Option ROM execution controller selectively disables execution of Option ROM at boot to decrease boot time. For instance, during deployment of applications to an information handling system, Option ROM associated with components that are not used in a deployment step are not loaded and executed in the boot sequence associated with the deployment step.

More specifically, a deployment module determines applications for deployment to an information handling system and boot sequences used for the deployment. An Option ROM selector module interfaced with deployment module identifies one or more Option ROMs to disable in the performance of at least on boot sequence of the application deployment based on the components used in the deployment. The Option ROM selector module communicates the Option ROMs selected to be disabled to an Option ROM boot execution controller associated with the information handling system to disable loading and execution of the selected Option ROM at reboot of the information handling system. For instance, all Option ROM execution is disabled for a deployment function of flashing the BIOS of the information handling system. As another example, Option ROM of a single bootable device is enabled, such as a NIC or hard disc drive, while other bootable devices are disabled, such as RAID devices or other PCI cards. In addition, Option ROM of selected devices used in a deployment function may be selectively enabled to support the deployment function so that boot time is reduced to the greatest extent possible without substantial impact on the deployment functions at manufacture of the information handling systems.

The present invention provides a number of important technical advantages. One example of an important technical advantage is that boot time is reduced so that deployment of applications at manufacture of an information handling system requires less time. Option ROM execution is performed for a component only if needed, such as if a boot is performed from the component or an operating system is installed to the component, functions that are not used during most reboots in a manufacture process. For a manufacturing assembly and application deployment asset that outputs a thousand information handling systems a day in which each system uses four reboots, a reduction in time for each boot of thirty seconds results in a total time savings per day for the asset of approximately thirty three hours.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The efficiency of information handling system manufacture deployment of applications is improved by reducing boot times associated with deployment functions, such as the installation and configuration of software, by selective disabling of Option ROMs at deployment boots. Option ROMs associated with devices not needed for a deployment function are disabled to reduce boot times without impact on the deployment functions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
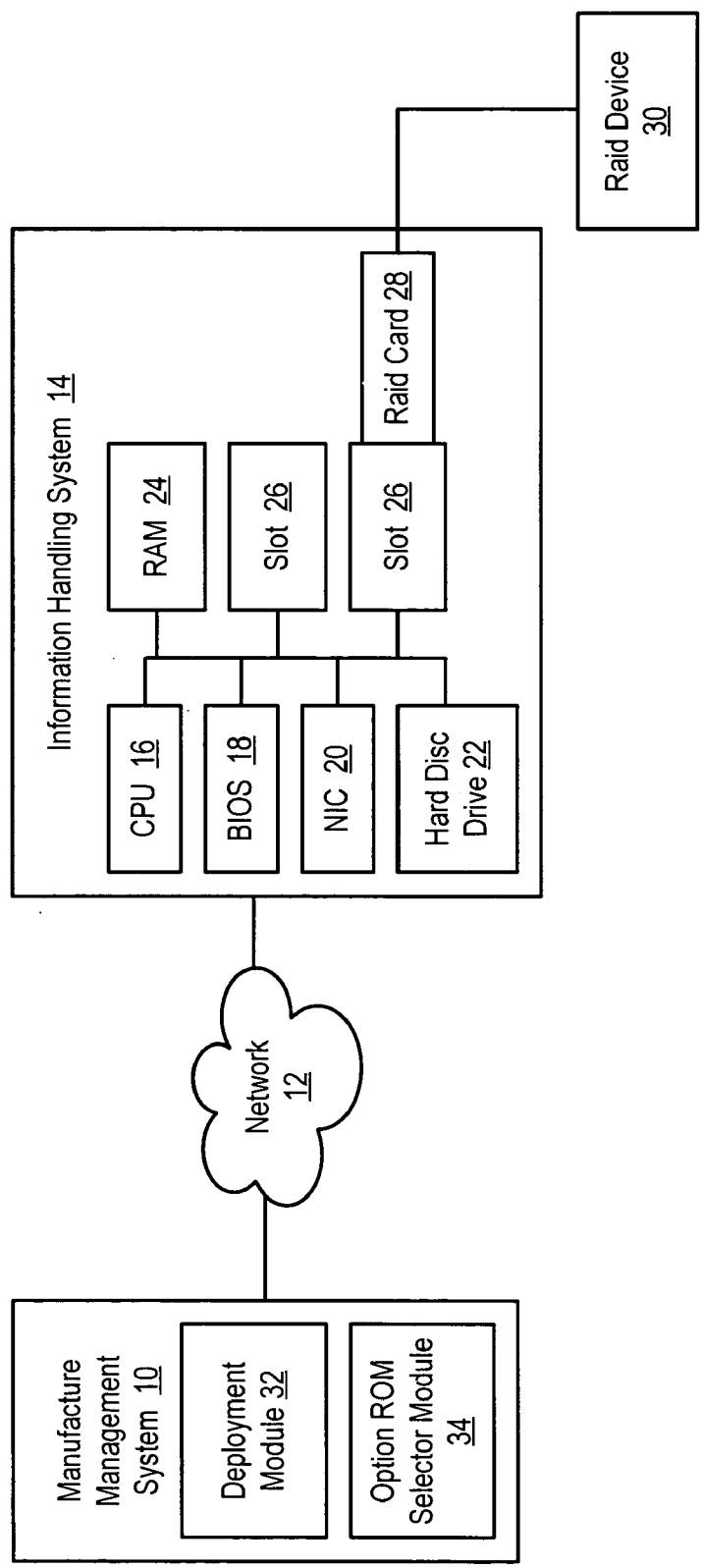
FIG. 1 depicts a block diagram of a system for managing selective Option ROM execution with software deployment to a manufactured information handling system.

Referring now to FIG. 1, a block diagram depicts a system for manufacture of an information handling system with selective disabling of processing component Option ROMs to reduce boot times associated with deployment functions. A manufacture management system 10 communicates applications and deployment instructions through a network 12 to a manufactured information handling system 14. In alternative embodiments, applications and deployment instructions may be communicated through portable media, such as floppy discs. Information handling system 14 includes a number of processing components to process information, such as a CPU 16, BIOS 18, network interface card (NIC) 20, hard disc drive 22 and random access memory 24. In addition, information handling system 14 has slots 26 that support additional devices, such as a RAID card 28 that interfaces with an internal or external RAID device 30. During a normal boot of information handling system 14, BIOS 18 scans the processing component devices to identify bootable devices having Option ROM that supports add-in controllers, and loads the Option ROM into memory for execution. The devices having Option ROM are identified, for instance, through classification with boot device class codes read from the devices' mass media controllers and may include SCSI, IDE, RAID, NIC, Fibre Channel and Infiniband devices.

At manufacture of information handling system 14, manufacture management system 10 manages deployment of software applications with a deployment module 32 that communicates deployment commands and deployment applications through network 12. For instance, some examples of deployment functions performed by deployment module 32 include communication of an application that flashes BIOS 18, communication of an application for storage on hard disc drive, a command for a PXE boot by NIC 20 to an identified network location for loading of an application to RAM 24, or a command to boot and execute an application stored on hard disc drive 22. As deployment module 32 communicates applications and commands to information handling system 12, the sequence of boots involved with the deployment applications and commands and the processing components used by the deployment applications and commands is provided to an Option ROM selector module 34. Option ROM selector module 34 identifies the Option ROMs that are needed and not needed within a boot sequence for a deployment application and communicates the Option ROMs identified as not necessary for disabling by the information handling system at the associated boot.

Figure 2:
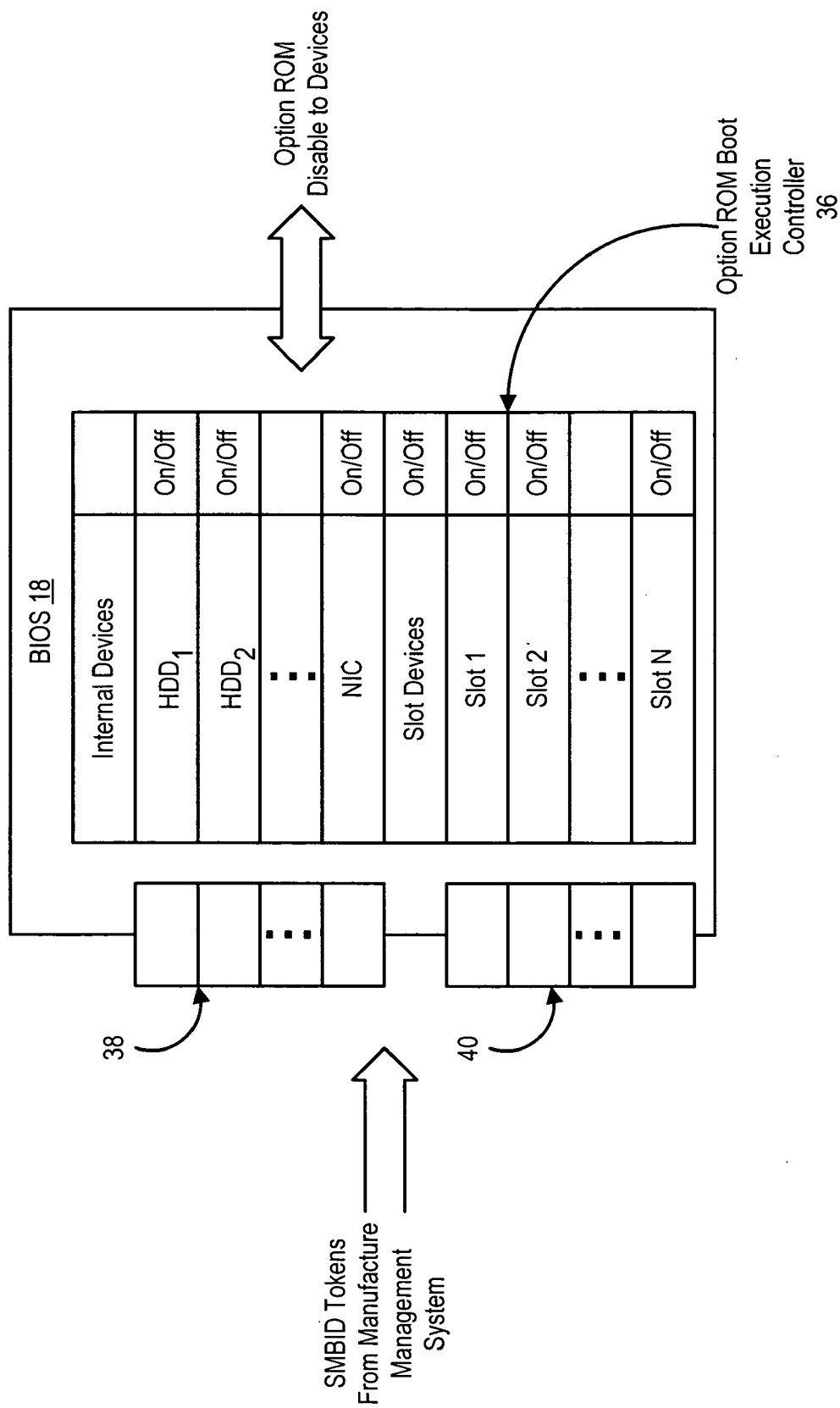
FIG. 2 depicts a block diagram of a BIOS operable for selective Option ROM execution.

Referring now to FIG. 2, a block diagram depicts a BIOS 18 with an Option ROM boot execution controller 36 that selectively disables loading of identified Option ROMS for execution at a subsequent boot. The Option ROMs identified for disablement are communicated as SMBIOS tokens to BIOS 18, such as to an internal device CMOS byte 38 and an external device CMOS byte 40 through a utility that sets the CMOS bits based on a device table in BIOS 18. In alternative embodiments, Option ROMs for disablement may be identified as a sequence of bits written to any known location readable by the BIOS. The utility is an internal or external agent in software or firmware having memory or I/O access to receive identified Option ROMs and communicate the disable Option ROMs to BIOS 18. For instance, Option ROM boot execution controller 36 associates a bit of each CMOS byte 38 and 40 with an internal or external device respectively. Setting the first bit of CMOS byte 38 disables Option ROM execution of Option ROM associated with the first hard disc drive at the next system boot. Setting the last bit of CMOS byte 38 disables Option ROM execution of Option ROM associated with the NIC at the next boot. Similarly, setting bits of CMOS byte 40 disables slot devices, such as RAID devices.

Figure 3:
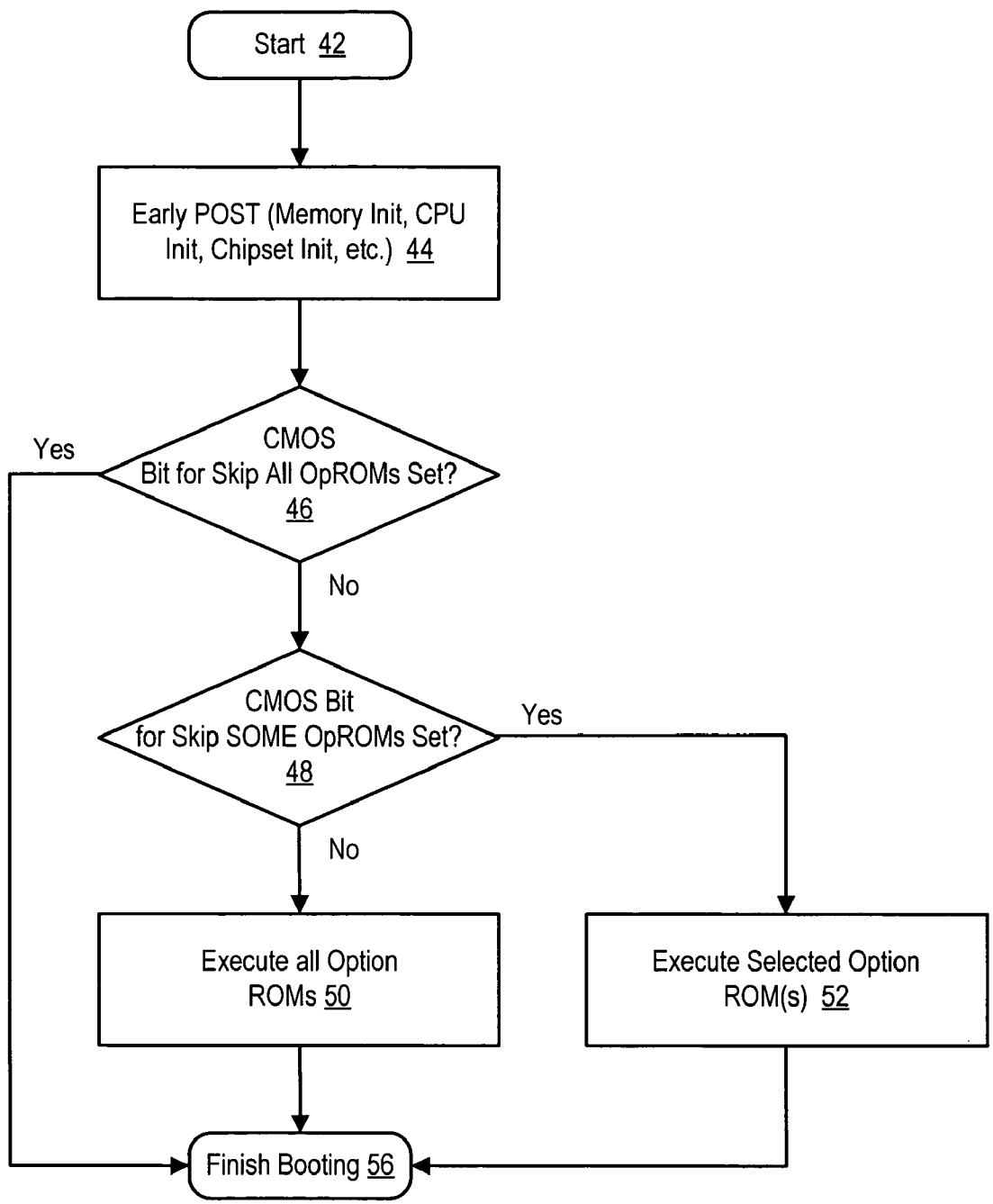
FIG. 3 depicts a flow diagram of a process for managing selective Option ROM execution with information handling system manufacture.

Referring now to FIG. 3, a flow diagram depicts one embodiment of a process for selective disabling of Option ROMs starting at step 42. At step 44, the information handling system performs early POST to initialize information handling system memory, CPU, chipset and other basic components. At step 46, a determination is made of whether a CMOS bit is set to skip all Option ROMs. If yes at step 46, the process completes at step 56 to finish boot of the information handling system without execution of any Option ROM. Such a boot is helpful, for instance, where the deployment function is a flashing of the BIOS or other similar function that does not involve operations by any other processing components.

If the determination at step 46 is no, then the process continues to step 48 to determine whether a CMOS bit is set to skip some Option ROMs, such as if some but not all CMOS bits are set. If the determination is no at step 48, the process continues to step 50 for with execution of all Option ROMs loaded and executed by the BIOS followed by completion of the boot at step 56. If the determination is yes at step 48, the process continues to step 52 for the execution of selected Option ROMs and disablement of non-selected Option ROMs with the CMOS bytes depicted in FIG. 2 used to determine the Option ROMs for execution. For instance, if a PXE boot is called for through the NIC, the Option ROM associated with the NIC is loaded and executed while the Option ROM associated with other devices are disabled to provide a more rapid boot time. Alternatively, if a boot from the hard disc drive is called for, the Option ROM associated with the hard disc drive is loaded and executed while the Option ROM associated with other devices are disabled to provide a more rapid boot time. Disabling of Option ROM associated with devices not involved in execution of a deployment function, such as RAID or PCI cards, potentially provides several minutes for a boot and thus decreases the overall time needed to deploy software to manufactured information handling systems that use several boots in the deployment process.

Although the present invention has been described in detail, it should be understood that various changes, substitutions and alterations can be made hereto without departing from the spirit and scope of the invention as defined by the appended claims.

What is claimed is:

1. A system for managing manufacture of an information handling system, the system comprising:
   a deployment module operable to determine boot commands during manufacture of an information handling system;
   an Option ROM selector module interfaced with the deployment module and operable to identify one or more Option ROMs to disable in the performance of at least an identified one of the boot commands; and
   an Option ROM boot execution controller associated with the information handling system and interfaced with the Option ROM selector module, the Option ROM boot execution controller operable to disable Option ROMs identified by the Option ROM selector module in the identified boot command.

2. The system of claim 1 wherein the Option ROM selector module disables all Option ROMS in a selected boot command.

3. The system of claim 2 wherein the selected boot command comprises a boot associated with flashing of a BIOS of the information handling system.

4. The system of claim 1 wherein the Option ROM selector module disables all Option ROMs except Option ROMs associated with boot devices that boot the information handling system and installation devices that perform installation functions after the boot command.

5. The system of claim 4 wherein at least one of the boot devices comprises a network interface card operable to perform a PXE boot from a network location.

6. The system of claim 4 wherein at least one of the boot devices comprises a hard disc drive.

7. The system of claim 1 wherein the Option ROM boot execution controller comprises a firmware module on a BIOS of the information handling system, and wherein the Option ROM execution controller is further operable to disable the loading of Option ROM code by the BIOS from the one or more devices associated with the one or more disabled Option ROMs.

8. The system of claim 7 wherein the Option ROM selector module communicates Option ROMs identified as disabled as SMBIOS tokens.

9. A method for manufacturing information handling systems with selective boots of Option ROMs, the method comprising:
   preparing a boot of the information handling system, the boot associated with a manufacturing function;
   identifying Option ROM devices of the information handling system;
   identifying any Option ROM devices associated with the boot and the manufacturing function;
   enabling the Option ROM devices associated with the boot and the manufacturing function and disabling the other option ROM devices; and
   executing the boot to load the Option ROMs associated with the enable Option ROM devices.

10. The method of claim 9 wherein the manufacturing function comprises flashing a BIOS of the information handling system and wherein no Option ROM devices are identified as associated with the boot and the manufacturing function.

11. The method of claim 9 wherein the boot comprises a PXE boot and the Option ROM device comprises a network interface card.

12. The method of claim 11 wherein the function comprises deploying software to the information handling system hard disc drive and the Option ROM device further comprise the hard disc drive.

13. The method of claim 9 wherein a disabled Option ROM device comprises a RAID device.

14. The method of claim 9 wherein a disabled Option ROM device comprises a PCI card.

15. The method of claim 9 wherein a disabled Option ROM device comprises a SCSI device.

16. An information handling system comprising:
   plural processing components operable to process information, the processing components assembled to accept applications from a network location, the applications deployed with plural boots of the information handling system, selected of the processing components storing Option ROM code for execution at boot of the information handling system; and
   an Option ROM boot execution controller interfaced with the processing components and operable to disable execution of selected Option ROM code in one or more application deployment boots;
   wherein disabling the execution of selected Option ROM code in one or more application deployment boots occurs during a manufacturing function of said information handling system.

17. The information handling system of claim 16 wherein the plural processing components comprise a BIOS, the Option ROM boot execution controller disabling all Option ROM code in an application deployment boot operable to flash the BIOS.

18. The information handling system of claim 16 wherein the plural processing components comprise a network interface card and a RAID card, the Option ROM boot execution controller disabling Option ROM associated with the RAID card, the information handling system booting to execute Option ROM associated with the network interface card in support of a PXE boot to a network location.

19. The information handling system of claim 16 wherein the plural processing components comprise a hard disc driver and a RAID card, the Option ROM boot execution controller disabling Option ROM associated with the RAID card, the information handling system booting to execute Option ROM associated with the hard disc drive to run a deployment application stored on the hard disc drive.

20. The information handling system of claim 16 wherein the plural processing components comprise a network interface card and a hard disc drive, the Option ROM boot execution controller disabling Option ROM associated with the hard disc drive, the information handling system booting to execute Option ROM associated with the network interface card in support of a PXE boot to a network location.

* * * * *